United States Patent
Ebbes

(10) Patent No.: US 10,206,537 B1
(45) Date of Patent: Feb. 19, 2019

(54) METHOD AND APPARATUS FOR MULTI-FUEL GRILL

(71) Applicant: Osvaldo Emilio Ebbes, San Carlos, CA (US)

(72) Inventor: Osvaldo Emilio Ebbes, San Carlos, CA (US)

(*) Notice: Subject to any disclaimer, the term of this patent is extended or adjusted under 35 U.S.C. 154(b) by 0 days.

(21) Appl. No.: 15/283,229

(22) Filed: Sep. 30, 2016

Related U.S. Application Data

(60) Provisional application No. 62/235,832, filed on Oct. 1, 2015.

(51) Int. Cl.
*A47J 37/00* (2006.01)
*A47J 37/07* (2006.01)

(52) U.S. Cl.
CPC ....... *A47J 37/0786* (2013.01); *A47J 37/0704* (2013.01); *A47J 37/0713* (2013.01); *A47J 37/00* (2013.01)

(58) Field of Classification Search
CPC .................. A47J 37/07; A47J 37/00
USPC ....... 126/25 R, 21 R, 41 R; 99/447
See application file for complete search history.

(56) References Cited

U.S. PATENT DOCUMENTS

| | | | | |
|---|---|---|---|---|
| 4,092,973 A | * | 6/1978 | Bernazzani | F24C 1/16 126/37 A |
| 6,000,389 A | * | 12/1999 | Alpert | A47J 37/0713 126/25 R |
| 6,050,177 A | * | 4/2000 | Lassig, Jr. | A47J 37/041 126/25 R |
| 6,176,233 B1 | * | 1/2001 | Babington | A47J 36/26 126/37 B |
| 2004/0112226 A1 | * | 6/2004 | Johnston | A47J 37/0704 99/339 |
| 2007/0221191 A1 | * | 9/2007 | O'Brien | A47J 37/0713 126/25 R |
| 2014/0352551 A1 | * | 12/2014 | Ducate | A47J 37/0704 99/339 |

* cited by examiner

*Primary Examiner* — Gregory Huson
*Assistant Examiner* — Nikhil Mashruwala
(74) *Attorney, Agent, or Firm* — Heimlich Law, PC; Alan Heimlich, Esq.

(57) ABSTRACT

A Method and Apparatus for Multi-Fuel Grill have been disclosed. In one version an attached fire box holds fuel.

18 Claims, 21 Drawing Sheets

"SARAH'S BBQ-GRILLS, CHARCOAL or GAS"

"SARAH'S BBQ-GRILLS, CHARCOAL or GAS"

"SARAH'S BBQ-GRILLS, CHARCOAL or GAS"

BASE

METHOD AND APPARATUS FOR MULTI-FUEL GRILL

RELATED APPLICATION

The present Application for Patent claims priority to U.S. Patent Application No. 62/235,832 titled "Method and Apparatus for Multi-Fuel Grill" filed Oct. 1, 2015, and which is hereby incorporated herein by reference.

FIELD OF THE INVENTION

The present invention pertains to grills. More particularly, the present invention relates to a Method and Apparatus for Multi-Fuel Grill.

BACKGROUND OF THE INVENTION

Grills are popular for cooking various foods.

Various foods are best prepared at different temperatures and using different heating methods.

This presents a technical problem for which a technical solution is needed using a technical means.

BRIEF DESCRIPTION OF THE DRAWINGS

The invention is illustrated by way of example and not limitation in the figures of the accompanying drawings. Same numbered items are not necessarily alike.

The accompanying Figures illustrate various embodiments of the invention.

DETAILED DESCRIPTION

A Method and Apparatus for Multi-Fuel Grill is disclosed.

While embodiments of the invention may illustrate a gas tank on its side, it is to be understood that the gas tank can be built for horizontal placement for gas delivery or more likely a standard propane gas tank would be vertically placed so that only gas vapor would exit from the tank valve assembly. That is, embodiments having the gas tank upright are also possible.

Embodiments of the invention are sometimes referred to as "Sarah's".

Description of some of the figure items for "SARAH'S BBQ-GRILLS, CHARCOAL OR GAS".

Description for "Sarah's BBQ-Grill, charcoal or gas"
- 100—Frame Grill
- 101—V-shaped grates
- 102—Pasador (tool) 1 with angle and blade at the end
- 103—Pasador (tool) 2 straight with blade at the end
- 104—Opening for transfer of charcoal to grill area when the food is ready to cook
- 105—Bricks for base and sides of frame grill
- 106—Tray Holder
- 107—Level 1 and 2 V-shaped grates (one for gas and the other for charcoal)
- 108—Horizontal door (put the door down) protection to prevent hot coals (charcoal) from falling out
- 109—Small door for fire box (preventing charcoal from falling out)
- 110—Big door for fire box (safety reason and hold the heat from charcoal)
- 111—Hinges
- 112—Locks for fire box door and horizontal door
- 113—Handles
- 114—Grease collector: flat, horizontal and removable for cleaning.
- 115—Grease can collector for 114, removable
- 116—Small roof and optional chimney for fire box from charcoal (it does open to the side, has 2 hinges and 1 handle)
- 117—Big roof and optional chimney for cooking area (it does open to the back, has 2 hinges & 1 handle)
- 118—Base or table for grill
- 119—Open space storage for grill gas box burner
- 120—Open to storage gas tank
- 121—Wheels
- 122—Burners
- 123—Control valves
- 124—Ignition
- 125—Valve connector to a gas tank
- 126—Metal box for burners
- 127—Tray holder for single long grill briquettes
- 128—Ceramic grill briquettes single, long units with sides allowing rotation (more usage)
- 129—Gas tank
- 130—Handles for grill frame
- 131—Hose connection to gas
- 132—The full length of gas supply hose
- 133—Regulator connection into regulator
- 134—Backside of connections nut to fitting 135—Connection nut to tank valve
136—Tank valve to cylinder
137—Charcoal flat (waving surface with handles e.g. fan) blowing air (metal and light)
138—Cutting board detachable with 2 levels.
139—Shovel for cleaning fire box (ash shovel)
140—A-B-C-D-E-F-G-H-I=metal sides and surfaces thicker than the others.
141—Metal base to hold bricks (laminate)
142—Cross bars metal to hold metal base (laminate, base for bricks)
143—Metal base for storage gas tank
144—Metal base for storage of gas burner assembly
145—Up & down for V-shaped grates grill (portable & detached)

Figure 1:
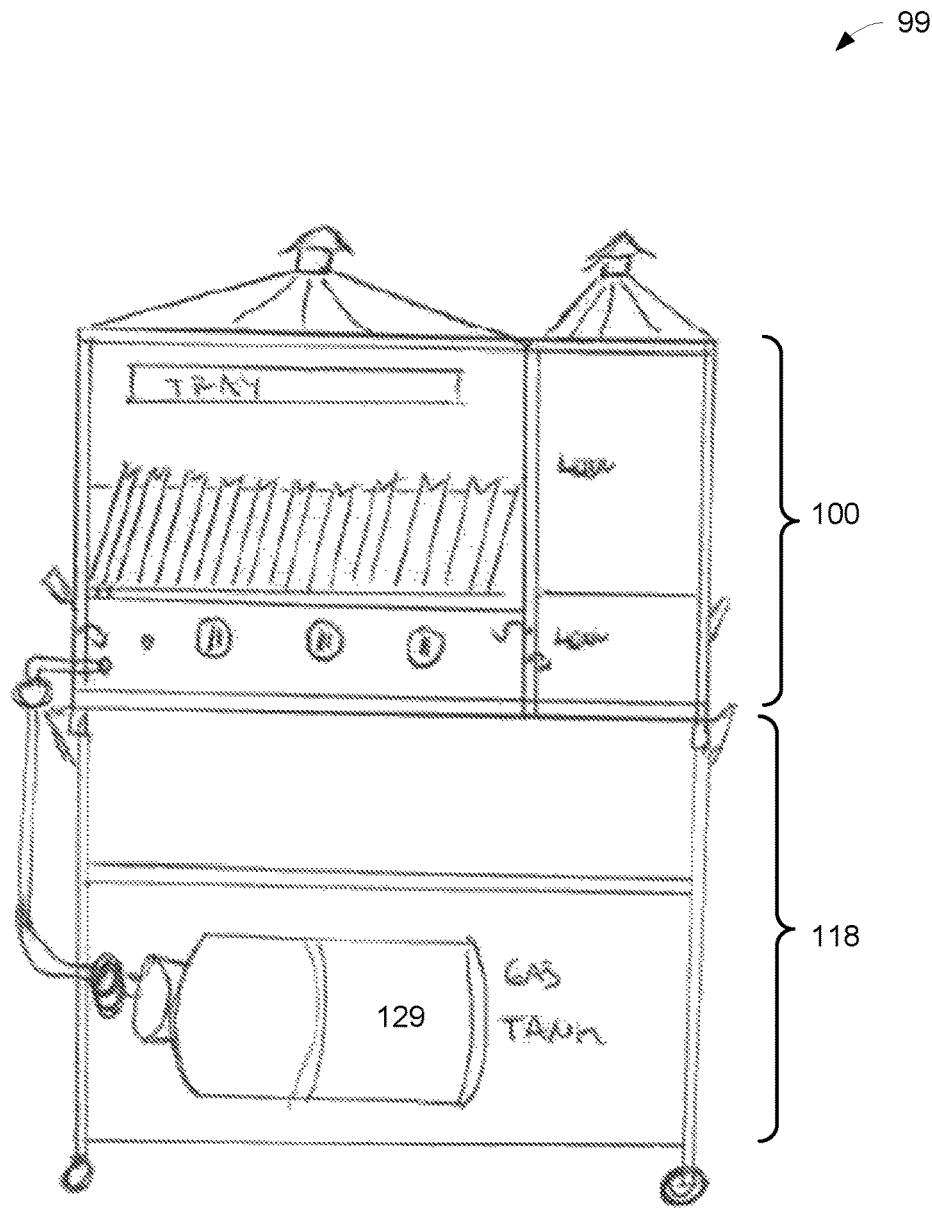
FIG. 1 illustrates, generally at 99, one embodiment of the invention.

FIG. 1 shows, generally at 99, one embodiment of the invention. At 129 is a gas tank within a base or table for grill 118. At 100 is a frame grill housing various components as described herein.

Figure 2:
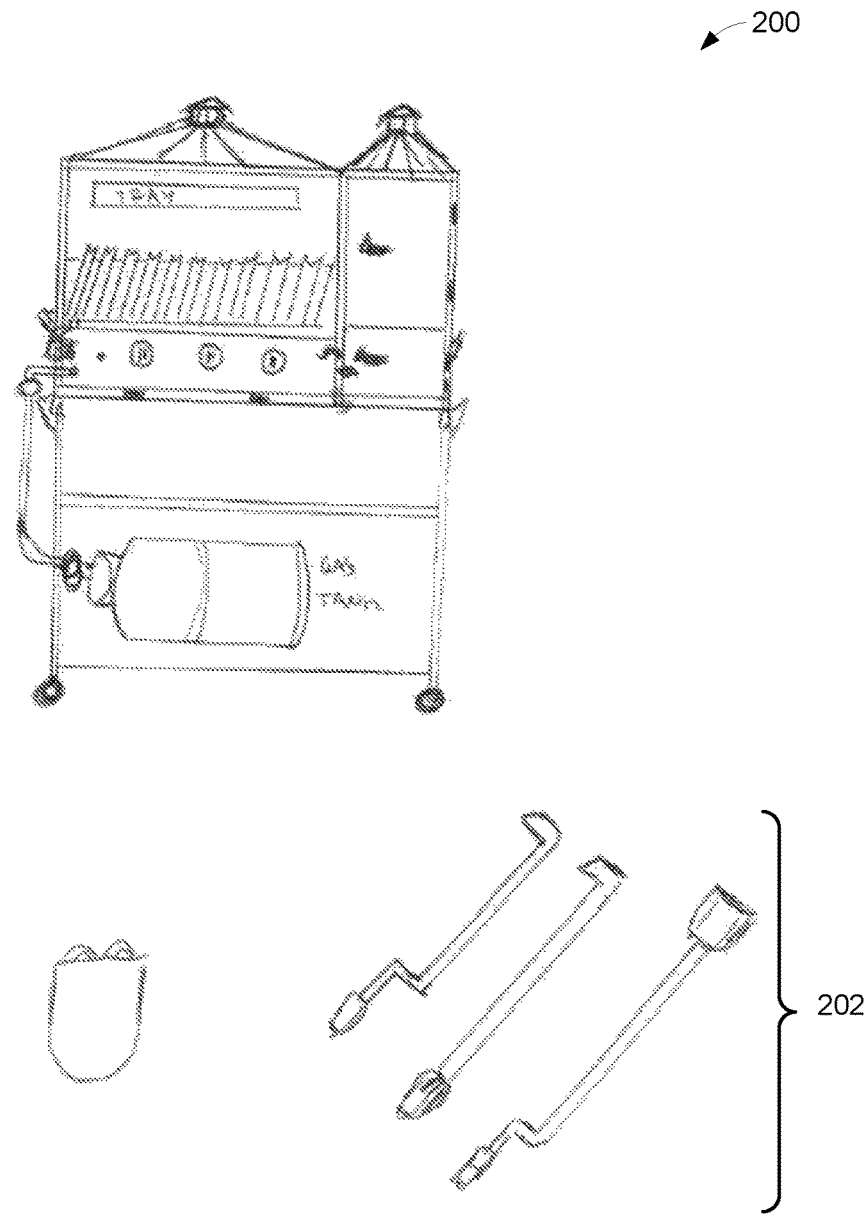
FIG. 2 illustrates, generally at 200, one embodiment of the invention.

FIG. 2 shows, generally at 200, one embodiment of the invention. At 202 are various implements as described herein.

Figure 3:
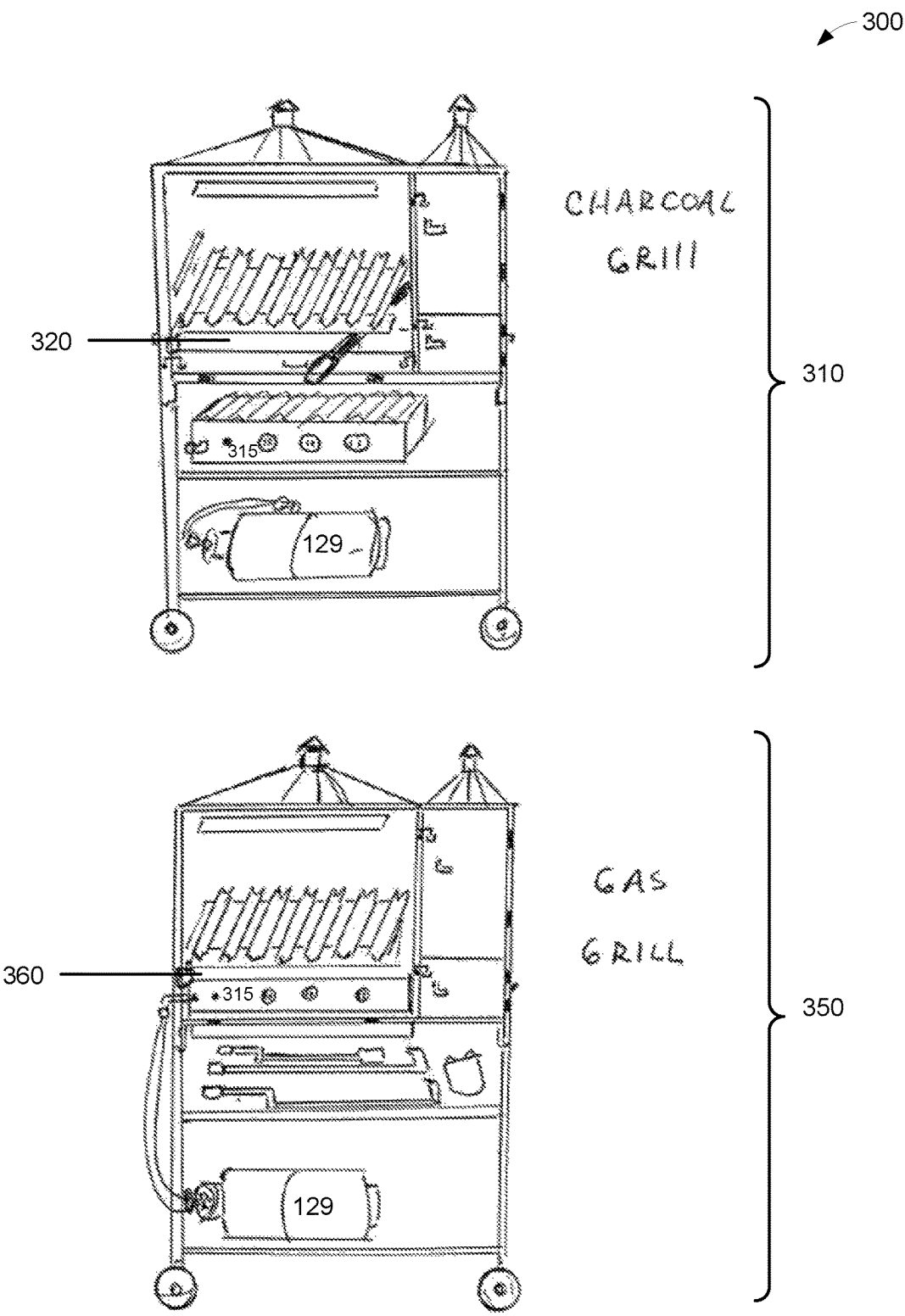
FIG. 3 illustrates, generally at 300, a charcoal grill embodiment and a gas grill embodiment.

FIG. 3 shows, generally at 300, one charcoal grill embodiment 310 and one gas grill embodiment 350. As can be seen in the charcoal grill embodiment 310 the gas tank 129 is not connected to the gas burner assembly 315 (having 122, 123, 124, 125, 126, 127, 128 disclosed in another figure). Also the gas burner assembly 315 is stored below the main grill area 320 (where charcoal will be located when using charcoal as the fuel). As can be seen in the gas grill embodiment 350 the gas tank 129 is connected to the gas burner assembly 315 (having 122, 123, 124, 125, 126, 127, 128 disclosed in another figure). Also the gas burner assembly 315 is now on the surface of the main grilling area 360 (charcoal not on the surface).

Figure 4:
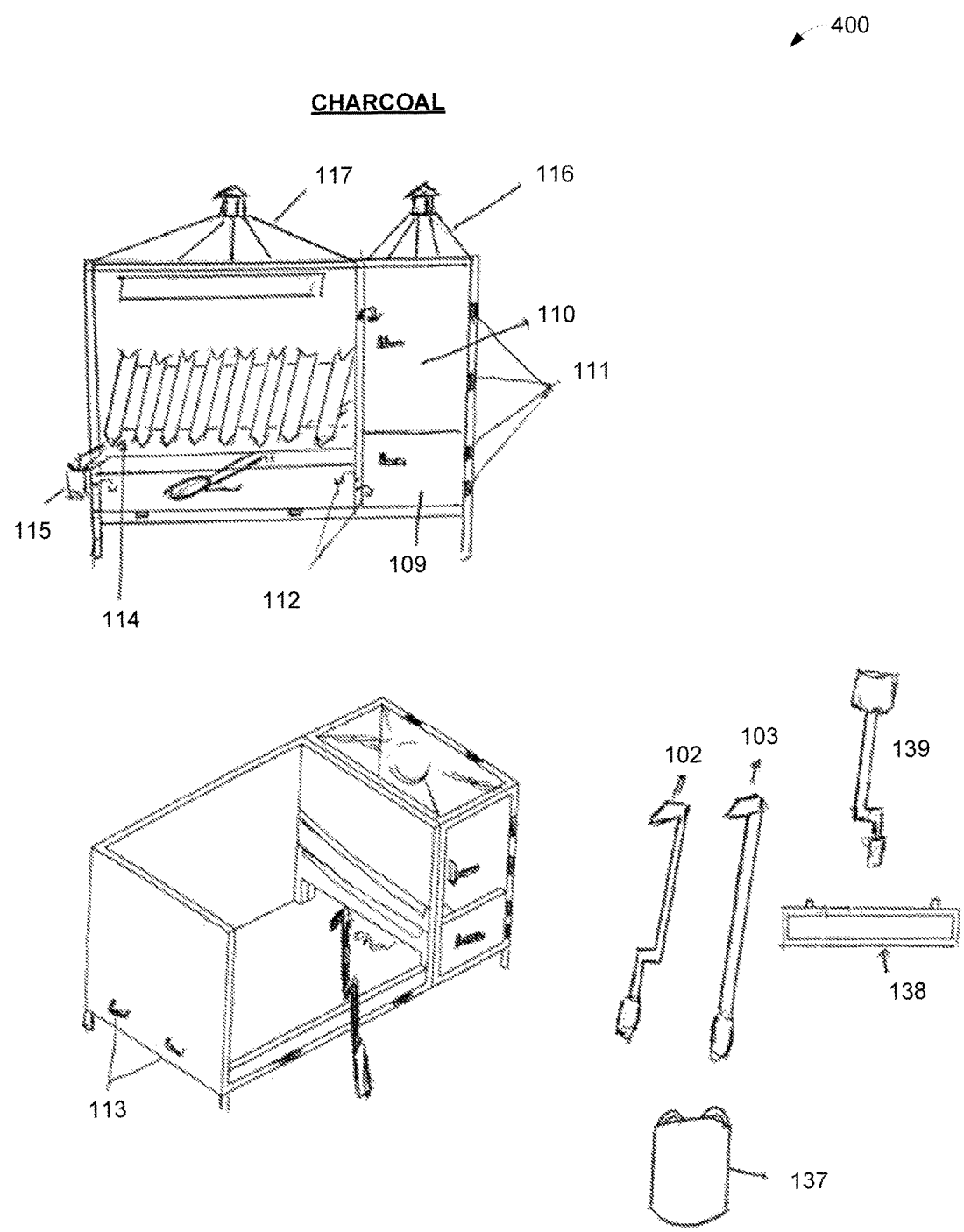
FIG. 4 illustrates, generally at 400, various embodiments of the invention when charcoal is used as the fuel, as well as implements.

FIG. 4 shows, generally at 400, various embodiments of the invention when charcoal is used as the fuel, as well as implements. The Description for "Sarah's BBQ-Grill, charcoal or gas" as noted above shows the various components.

Figure 5:
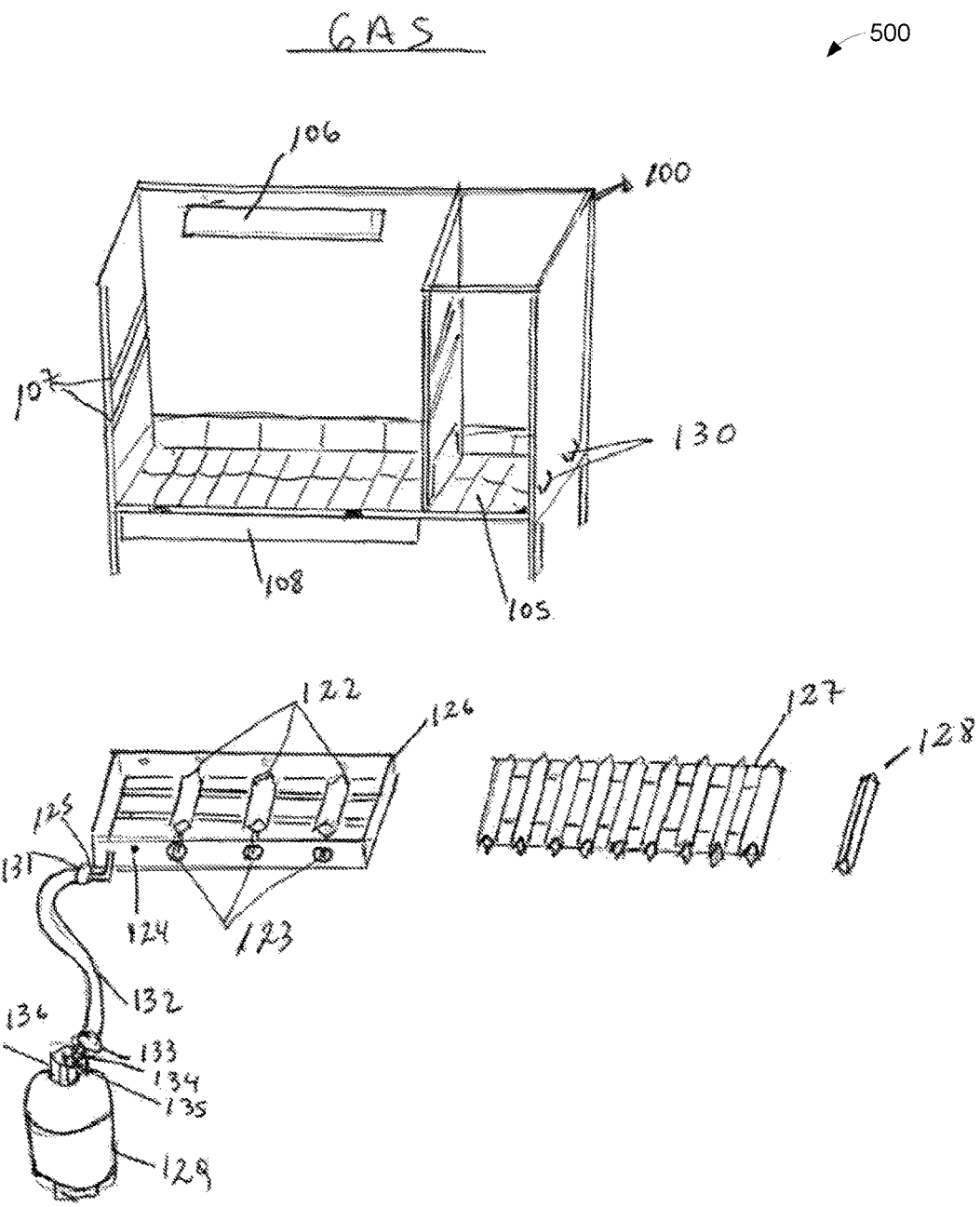
FIG. 5 illustrates, generally at 500, various embodiments of the invention when gas is used as the fuel.

FIG. 5 shows, generally at 500, various embodiments of the invention when gas is used as the fuel. The Description for "Sarah's BBQ-Grill, charcoal or gas" as noted above shows the various components.

Figure 6:
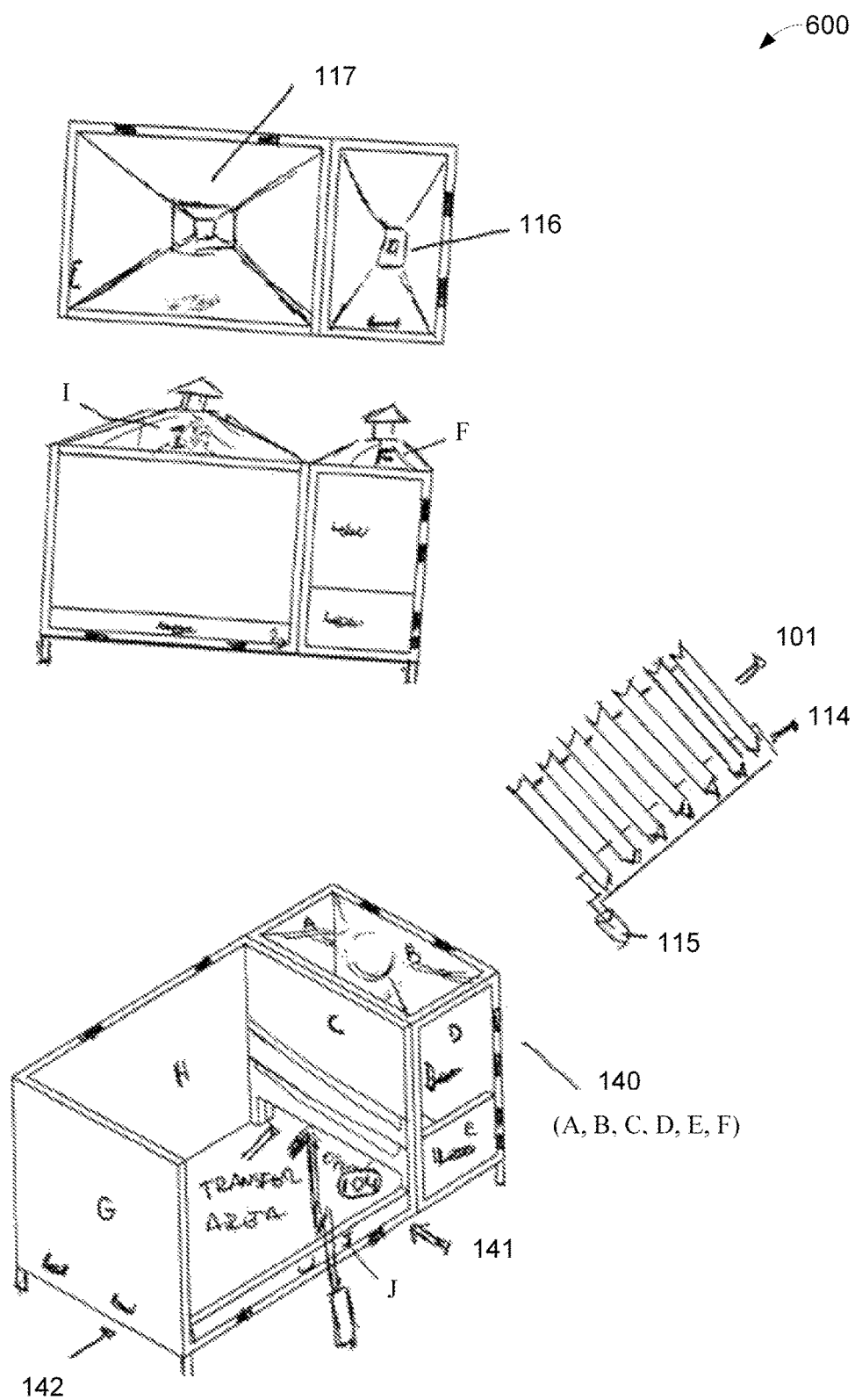
FIG. 6 illustrates, generally at 600, various embodiments of the invention.

FIG. 6 shows, generally at 600, various embodiments of the invention. The Description for "Sarah's BBQ-Grill, charcoal or gas" as noted above shows the various components.

Figure 7:
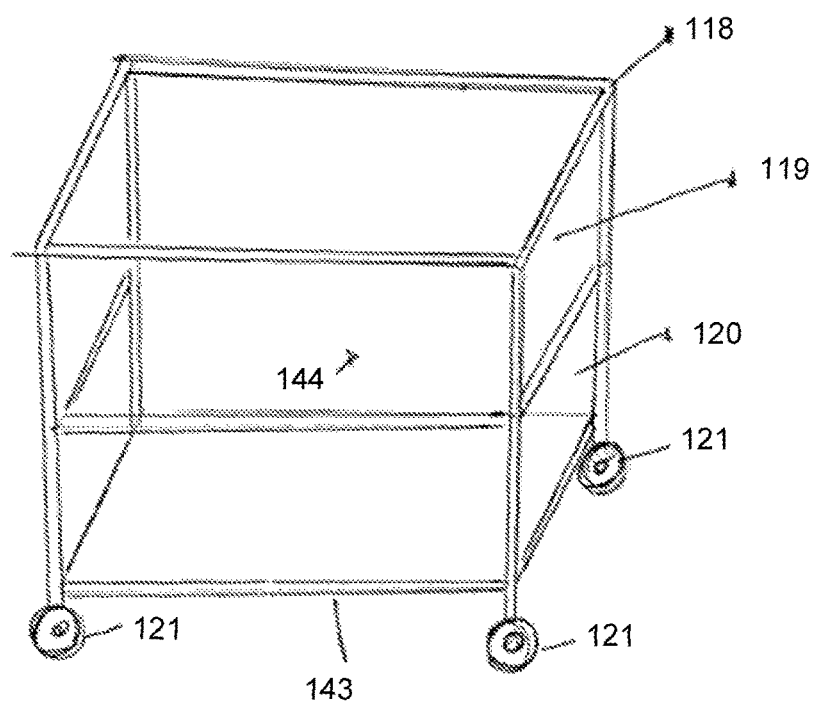
FIG. 7 illustrates, generally at 700, a base.

FIG. 7 shows, generally at 700, a base. The Description for "Sarah's BBQ-Grill, charcoal or gas" as noted above shows the various components.

Figure 8:
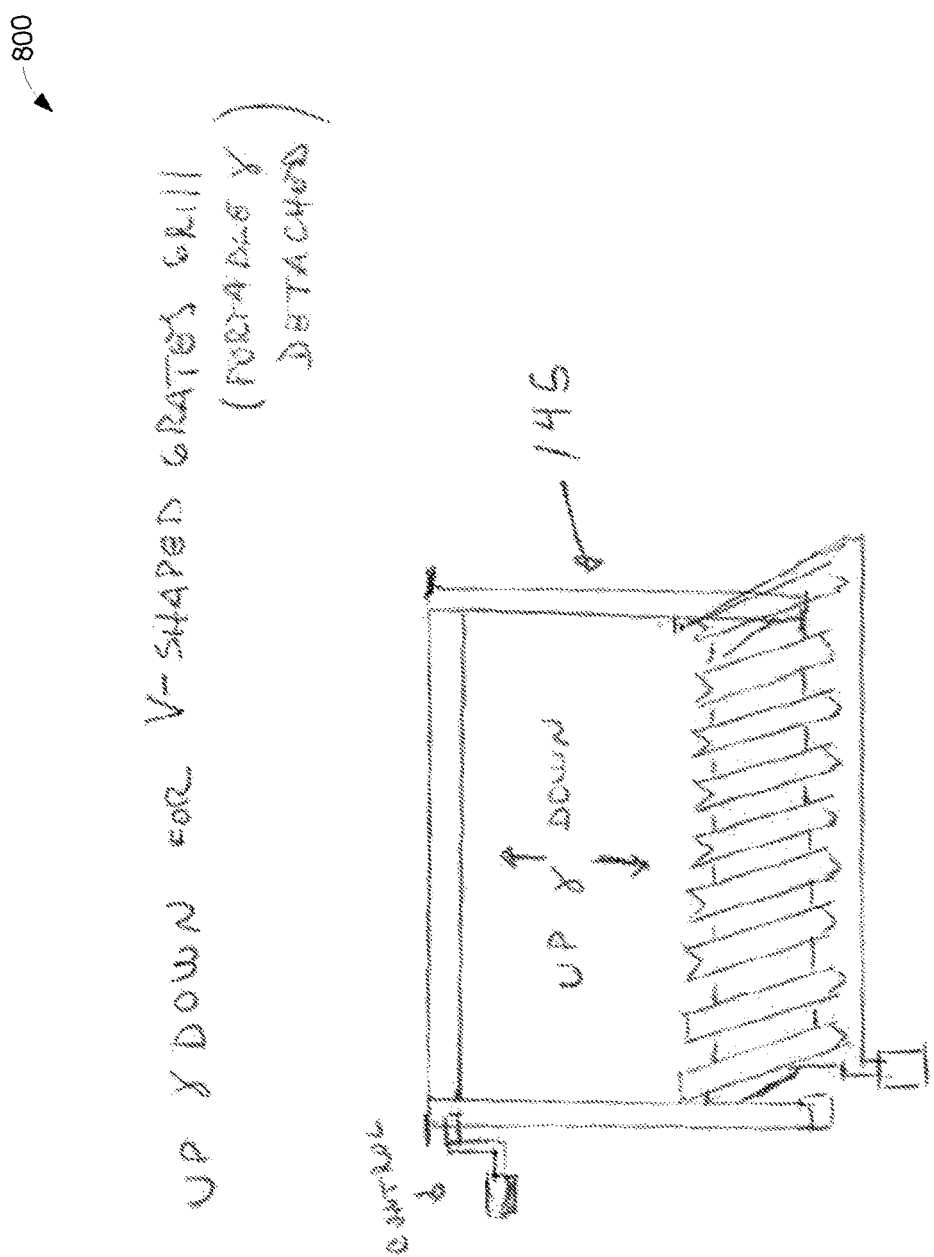
FIG. 8 illustrates, generally at 800, an up and down motion for the grates.

FIG. 8 shows, generally at 800, an up and down motion for the grates. The Description for "Sarah's BBQ-Grill, charcoal or gas" as noted above shows the various components.

Figure 9:
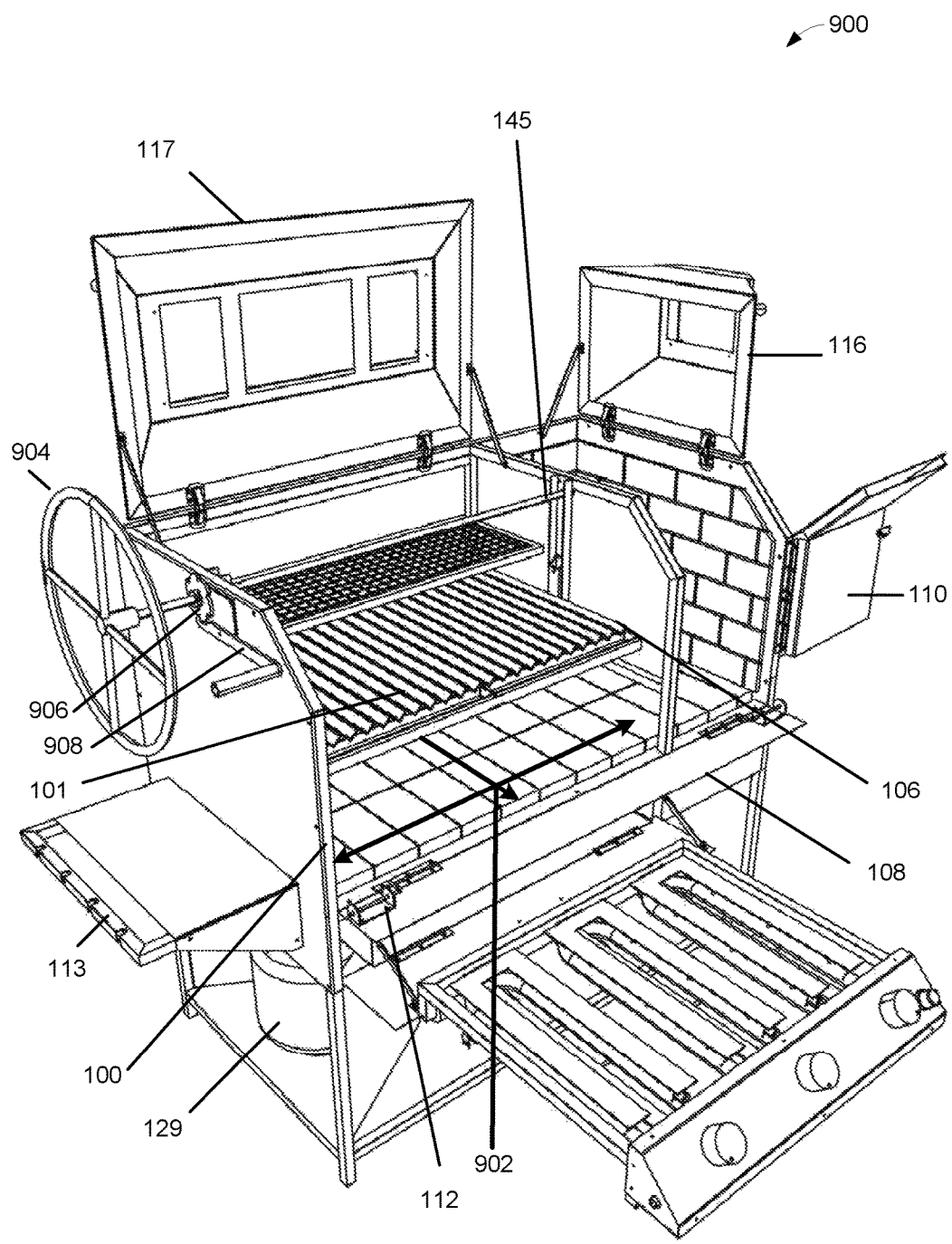
FIG. 9 illustrates, generally at 900, an open view of one embodiment of the invention.

FIG. 9 illustrates, generally at 900, an open view of one embodiment of the grilling apparatus. At 902 is a main grilling area shown here lined with bricks which extend across the front and to the rear of the grilling apparatus. At 904 is crank mechanism handle, at 906 a ratchet assembly, and at 908 a releaseable pawl. At 100 is a frame for the grill, at 129 is a gas tank for use when using the gas burner unit, at 101 are the V-shaped grates, at 112 is a locking mechanism for the firebox door and horizontal door, here the horizontal door 108 is shown as a single unit, at 106 is the tray holder, at 110 is a fire box door having a portion vertical and a portion slanted, at 116 is a roof for the main fire box, at 145 is the up and down crank mechanism, at 117 the openable roof for the main grilling enclosure, at 113 is a side shelf and handle.

Figure 10:
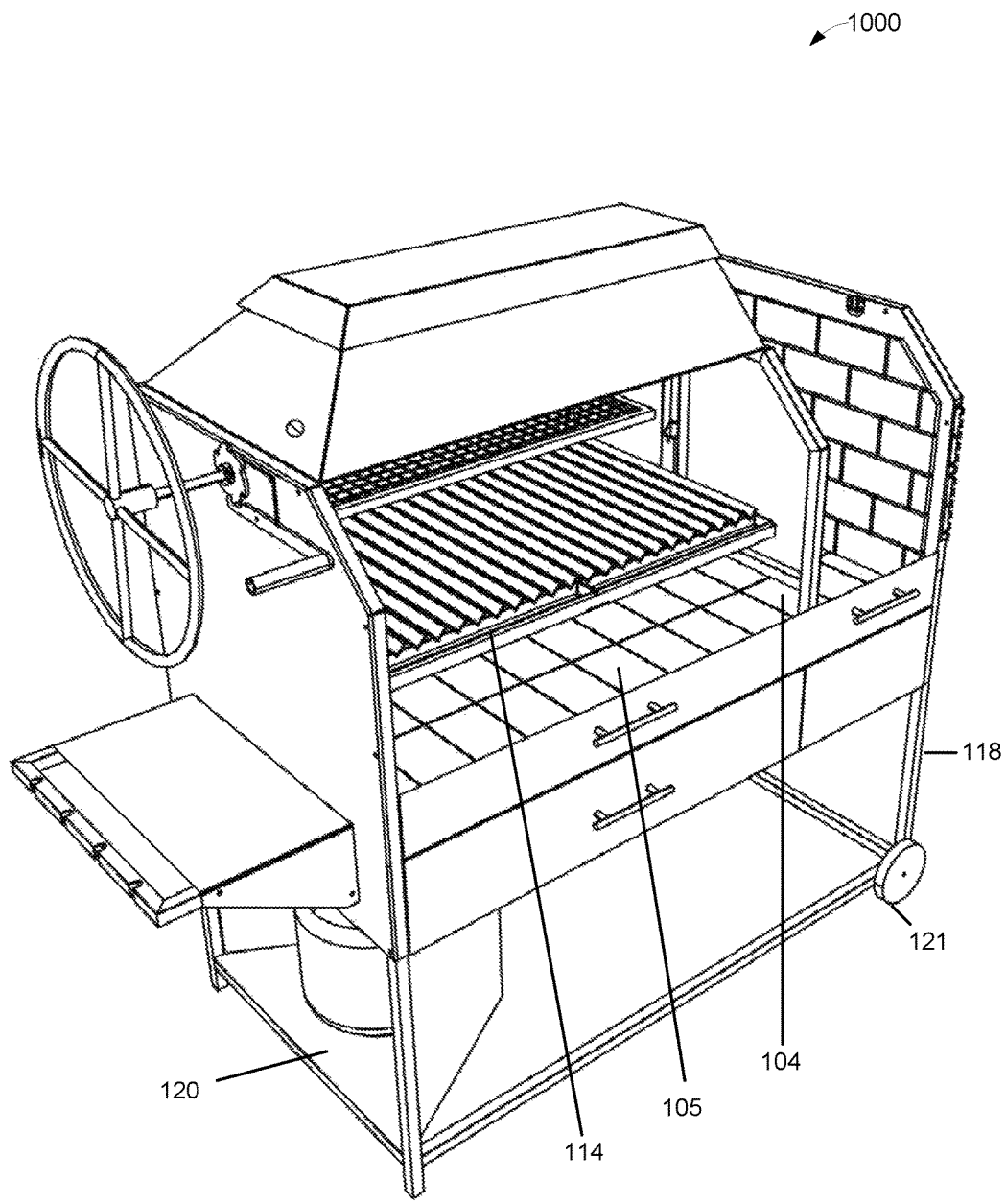
FIG. 10 illustrates, generally at 1000, a closed view of one embodiment of the invention.

FIG. 10 illustrates, generally at 1000, a closed view of one embodiment of the invention. At 120 is an open area for storing a gas tank, at 114 is a grease collector, at 105 are bricks lining the bottom of the main grilling area, at 104 is the opening between the main grilling enclosure and the main fire box, at 121 a wheel, and at 118 the base for the grill (main grilling enclosure and main fire box).

Figure 11:
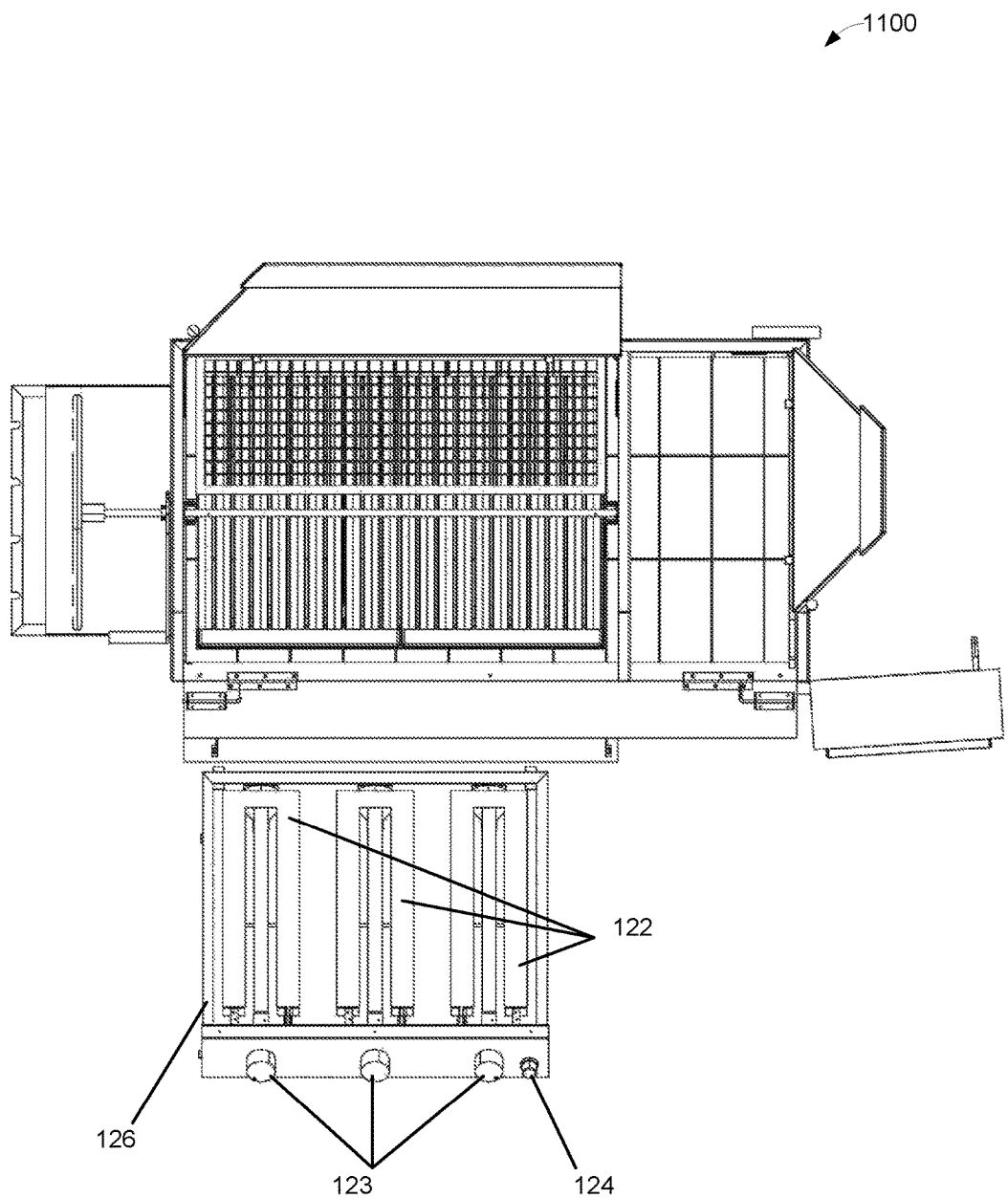
FIG. 11 illustrates, generally at 1100, a top view of one embodiment of the invention.

FIG. 11 illustrates, generally at 1100, a top view of one embodiment of the invention. At 126 is a metal box holding the gas burner assembly which has at least the burners 122 and the control valves 123 and the ignition 124.

Figure 12:
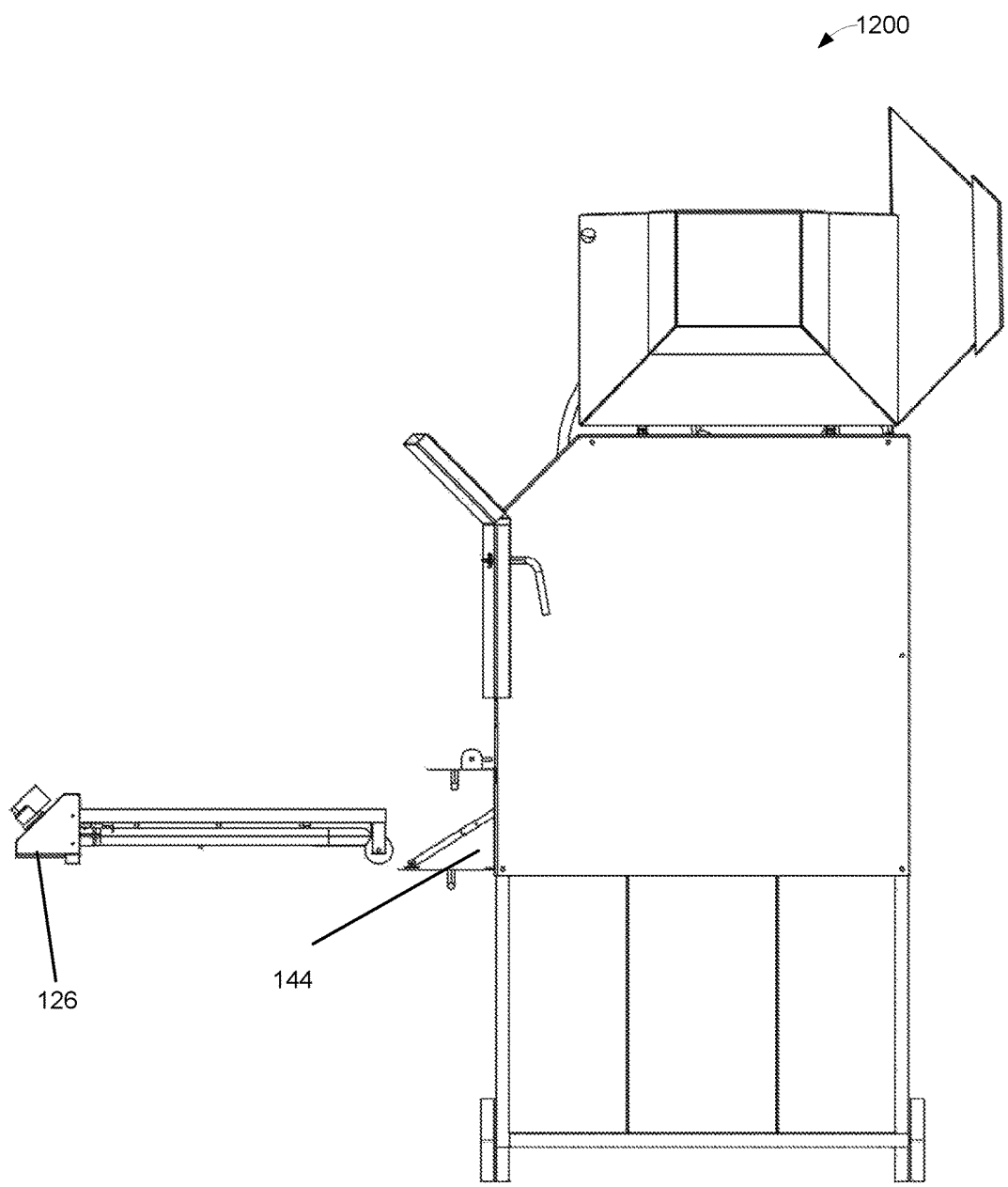
FIG. 12 illustrates, generally at 1200, a side view of one embodiment of the invention.

FIG. 12 illustrates, generally at 1200, a side view of one embodiment of the multi fuel grill structure. At 126 is the metal box for the gas burner assembly and at 144 is the opening of the base for storage of the gas burner assembly.

Figure 13:
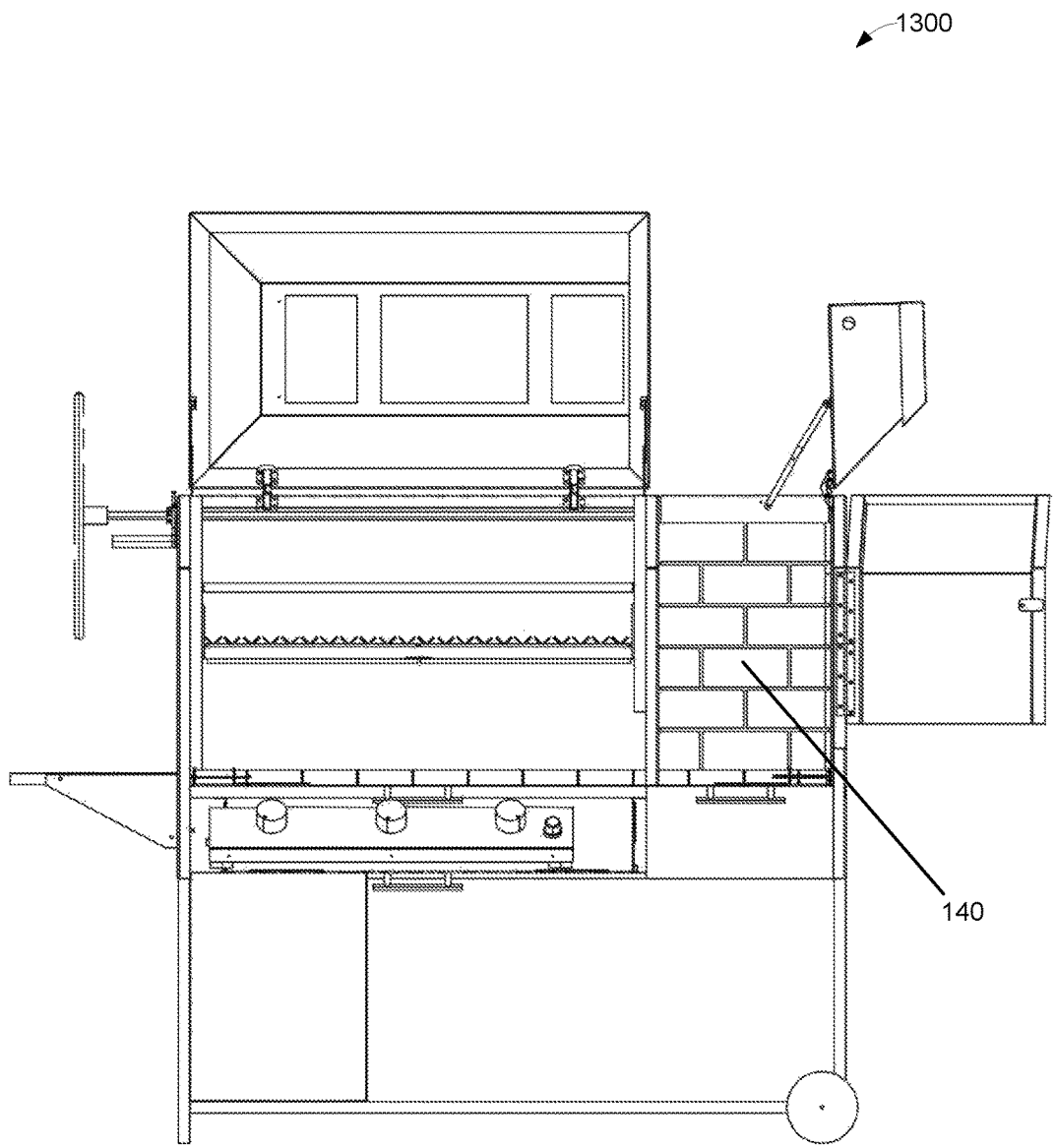
FIG. 13 illustrates, generally at 1300, a front view of one embodiment of the invention.

FIG. 13 illustrates, generally at 1300, a front view of one embodiment of the invention. At 140 is the back of the main fire box made of metal and here shown lined with bricks.

Figure 14:
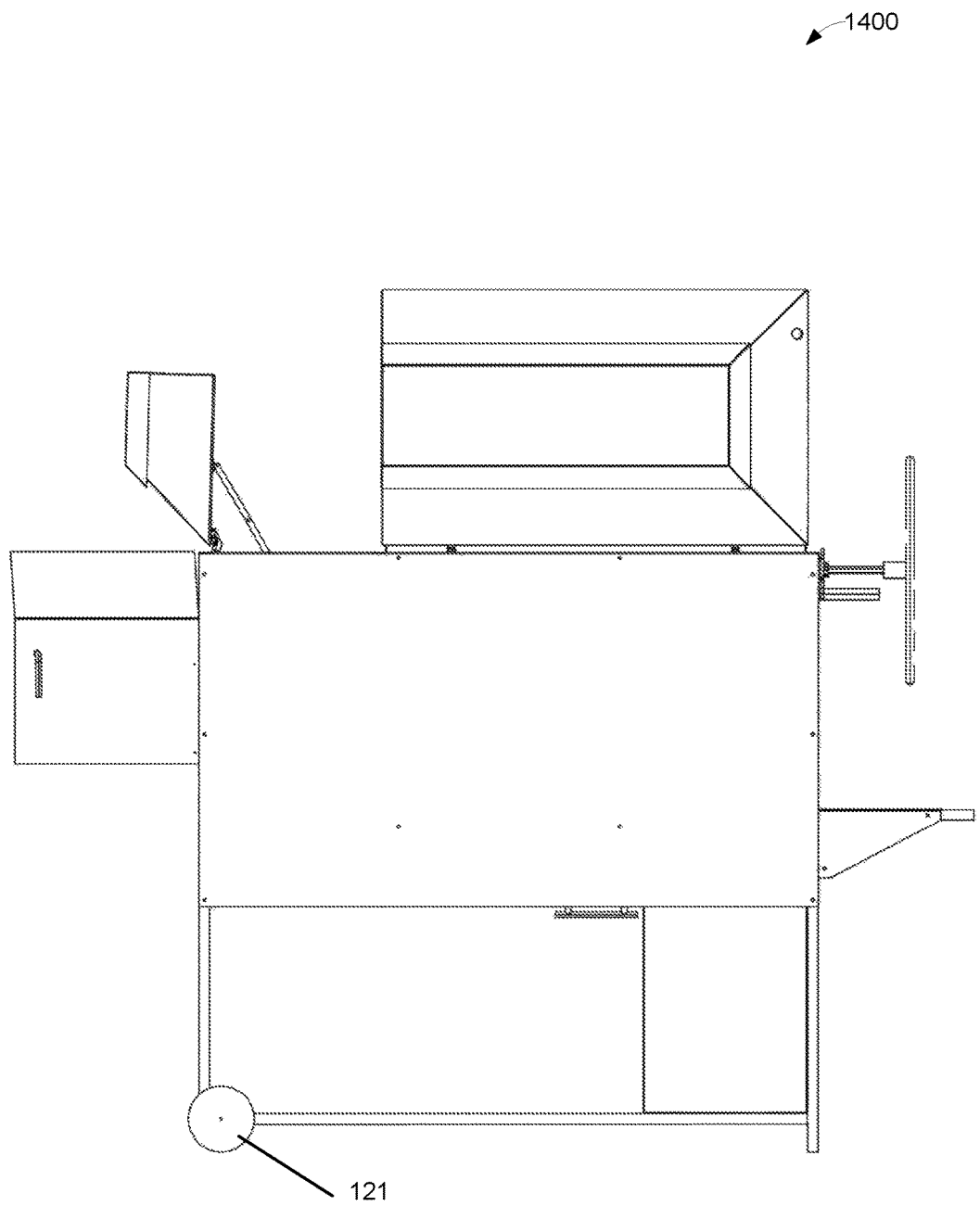
FIG. 14 illustrates, generally at 1400, a back view of one embodiment of the invention.

FIG. 14 illustrates, generally at 1400, a back view of one embodiment of the invention. At 121 is a wheel.

Figure 15:
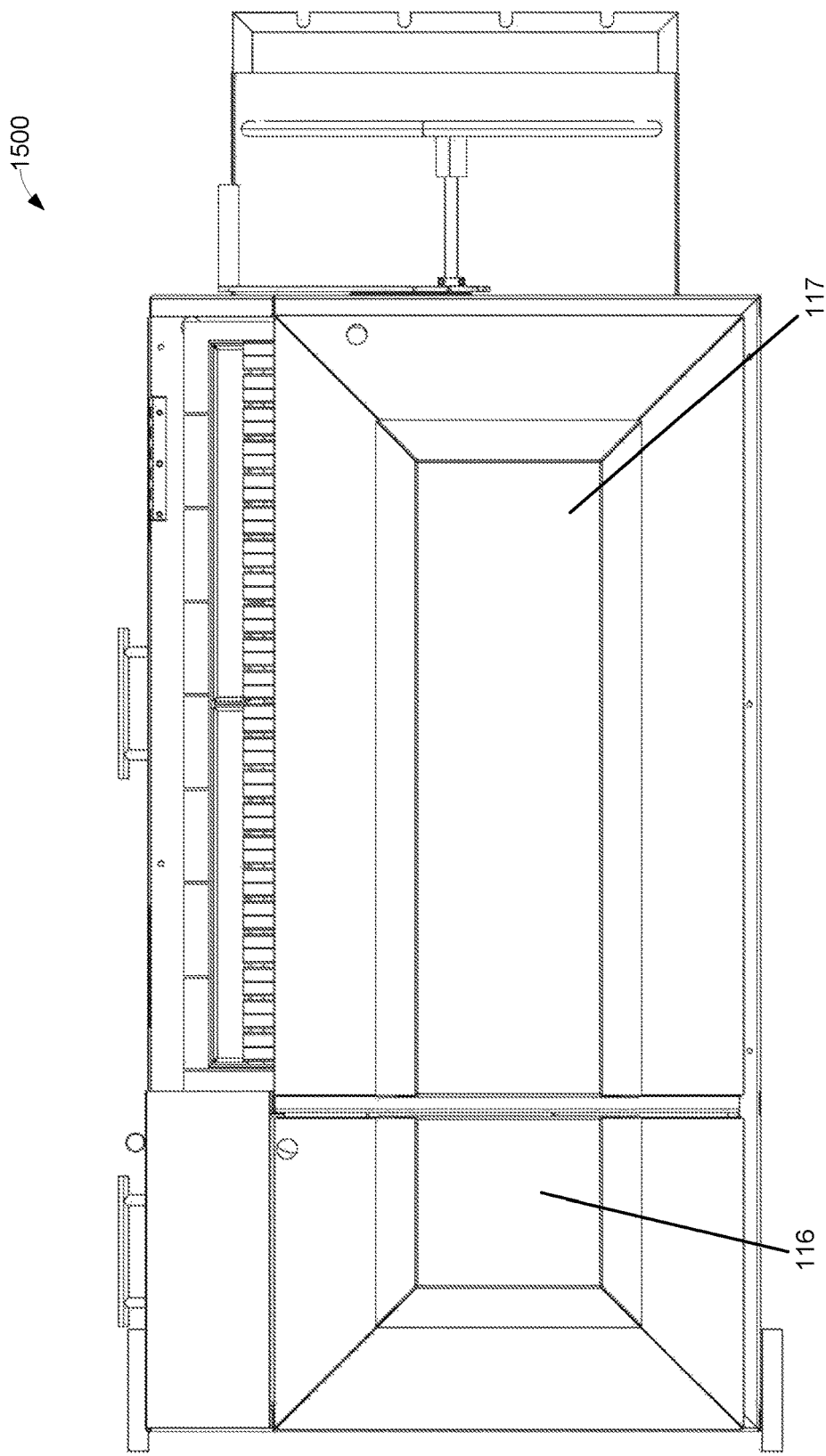
FIG. 15 illustrates, generally at 1500, a closed top view of one embodiment of the invention.

FIG. 15 illustrates, generally at 1500, a closed top view of one embodiment of the invention. At 117 is the main grilling enclosure top, and at 116 is the main fire box top, both shown in a closed position.

Figure 16:
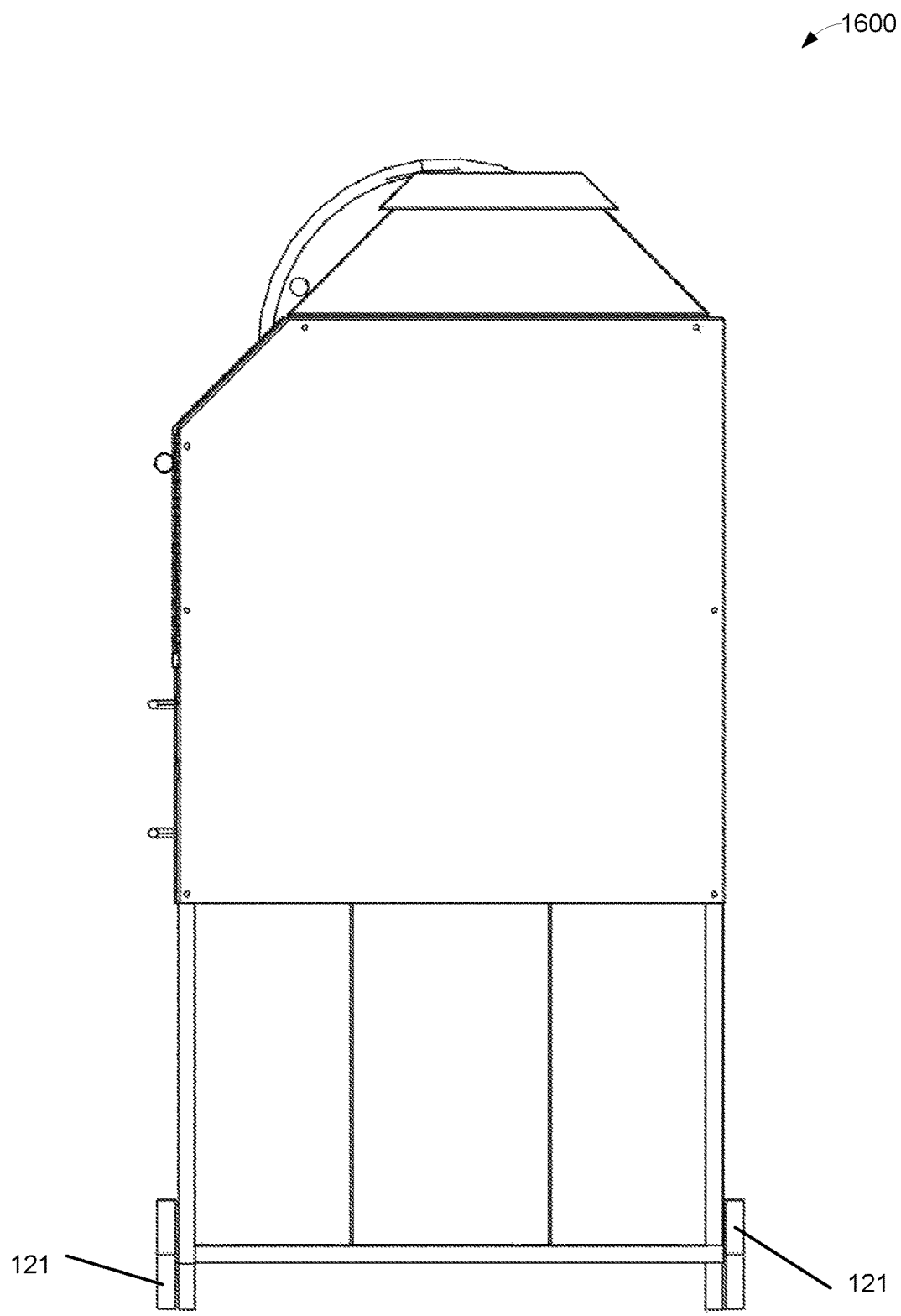
FIG. 16 illustrates, generally at 1600, a closed side view of one embodiment of the invention.

FIG. 16 illustrates, generally at 1600, a closed side view of one embodiment of the invention. At 121 are wheels.

Figure 17:
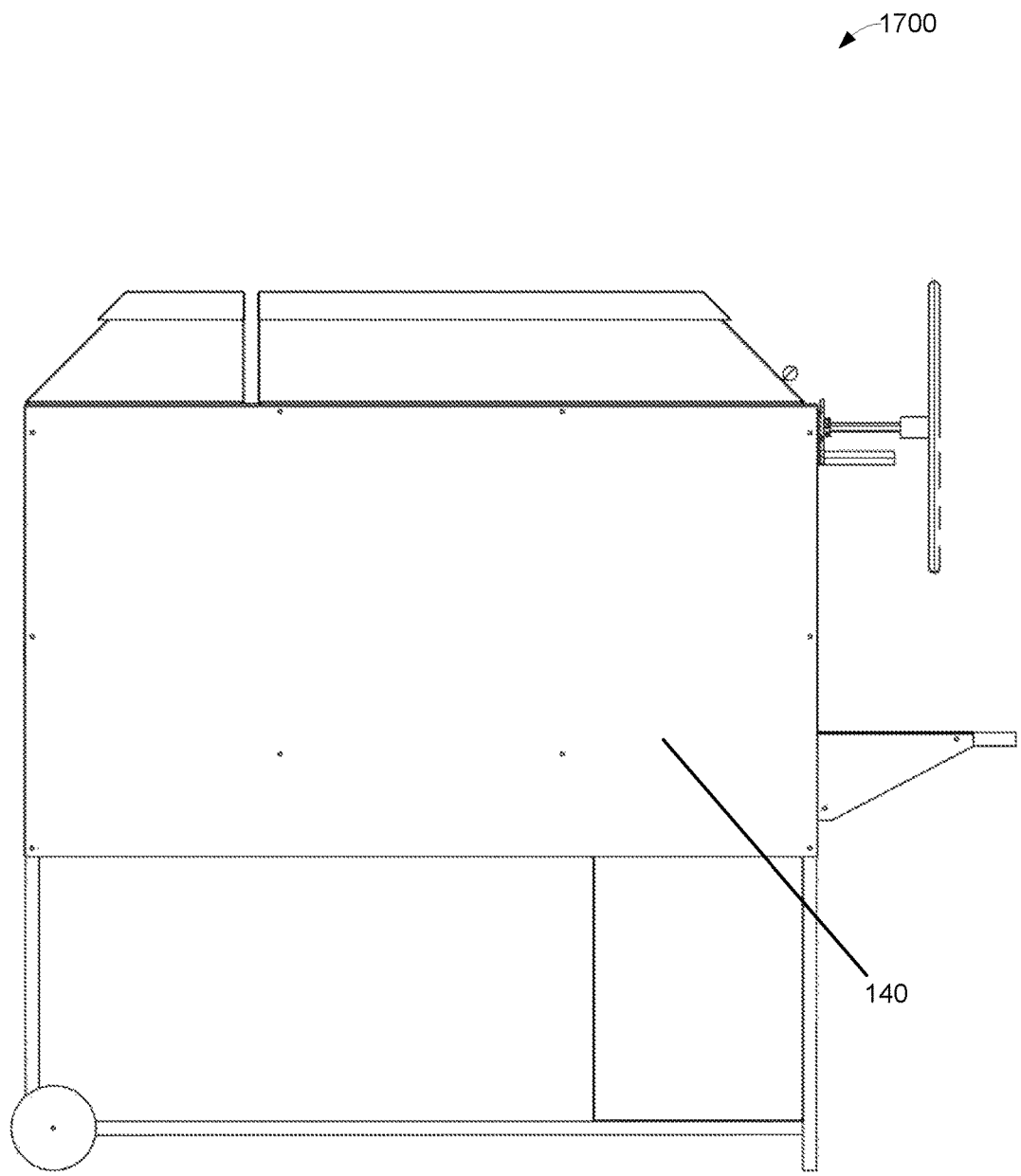
FIG. 17 illustrates, generally at 1700, a closed back view of one embodiment of the invention.

FIG. 17 illustrates, generally at 1700, a closed back view of one embodiment of the invention. At 140 is shown a back of the main grilling enclosure and main fire box that is constructed out of metal thick enough to withstand the heat from the grill and fire box.

Figure 18:
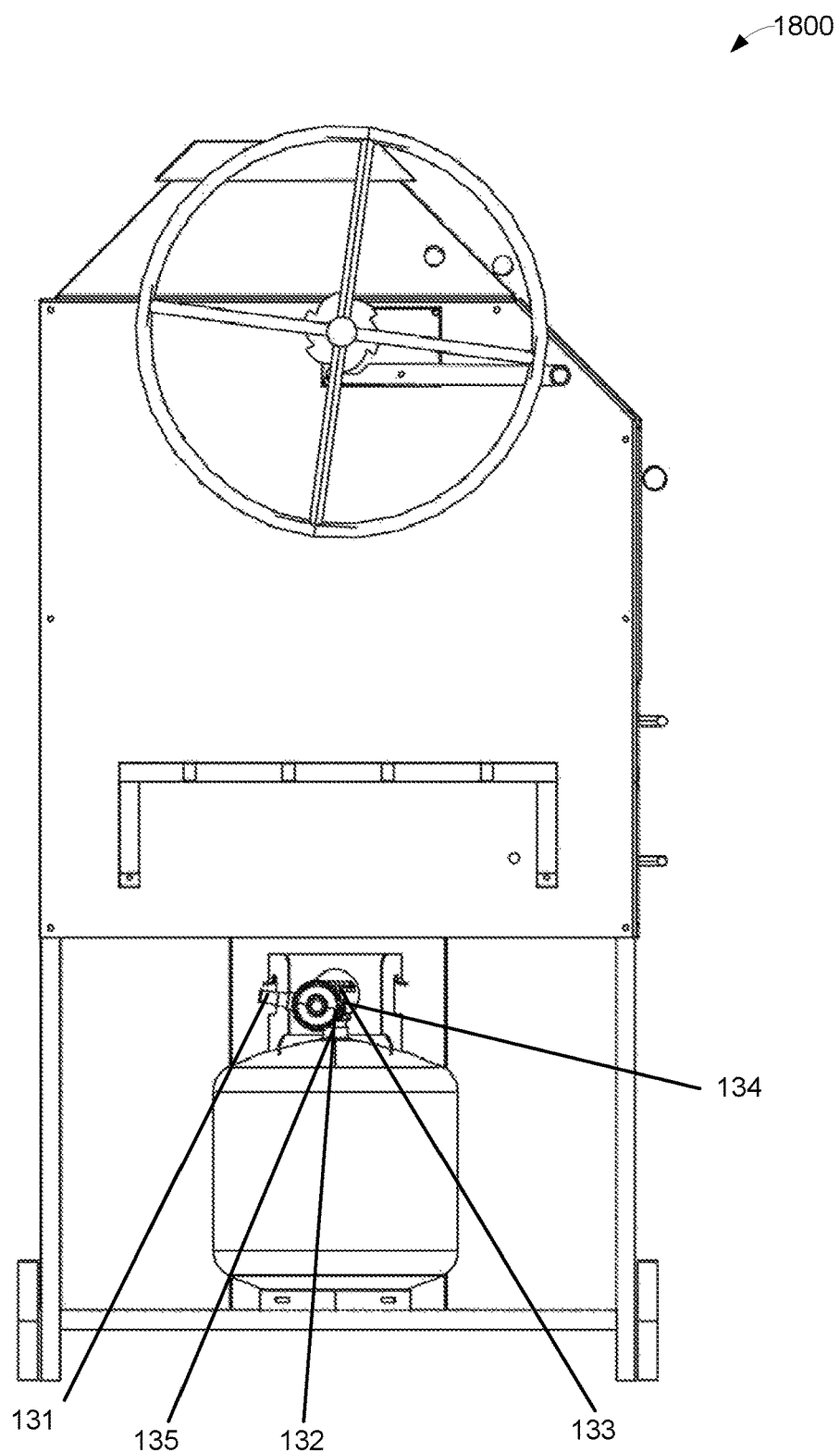
FIG. 18 illustrates, generally at 1800, a closed side view of one embodiment of the invention.

FIG. 18 illustrates, generally at 1800, a closed side view of one embodiment of the invention. At 131 is the hose connection to the gas, at 135 the connection to the gas tank, at 132 the gas supply hose, at 133 the regulator connection to the regulator, and at 134 the connection nut to the fitting.

Figure 19:
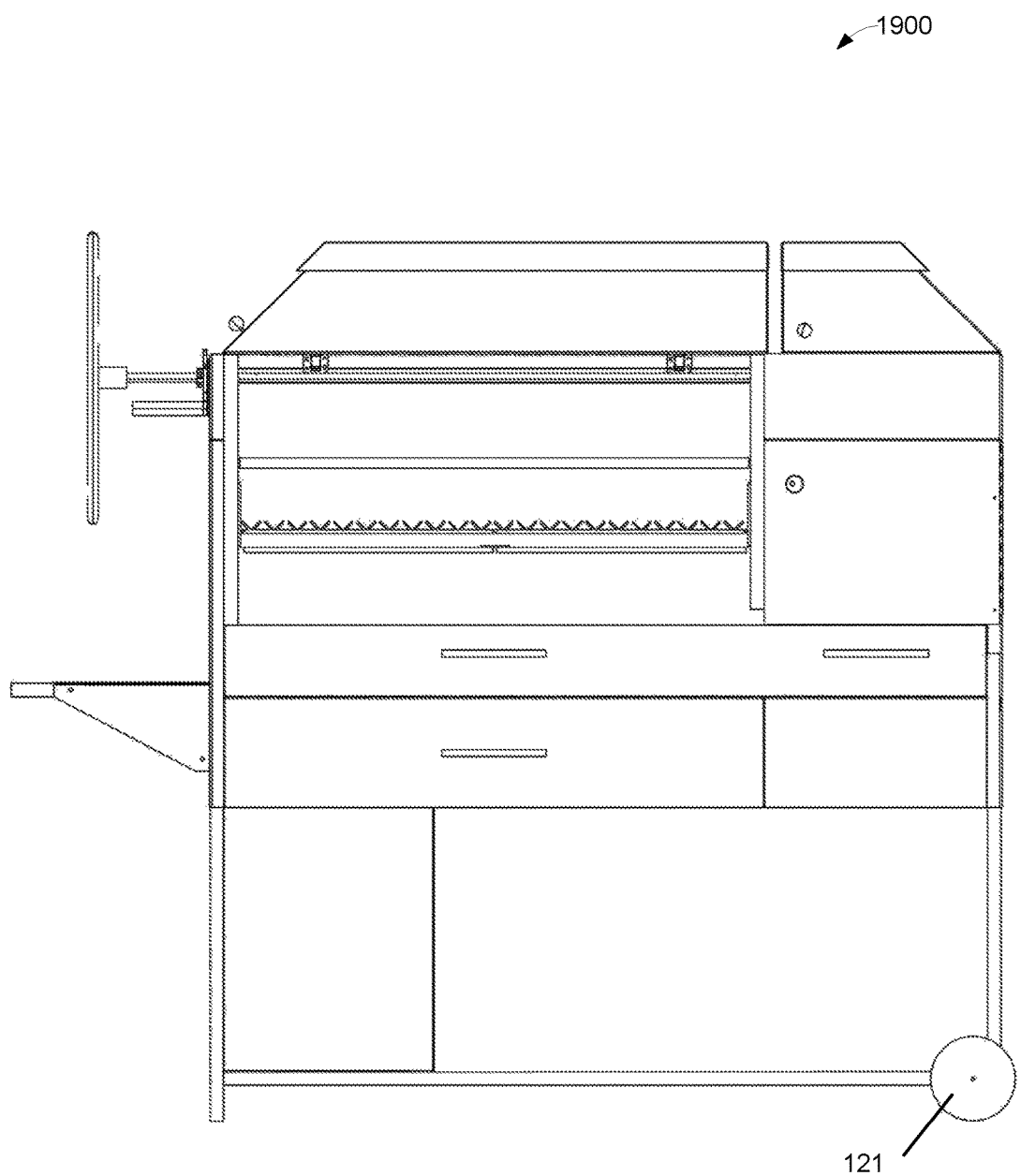
FIG. 19 illustrates, generally at 1900, a closed front view of one embodiment of the invention.

FIG. 19 illustrates, generally at 1900, a closed front view of one embodiment of the invention. At 121 is shown a wheel.

Figure 20:
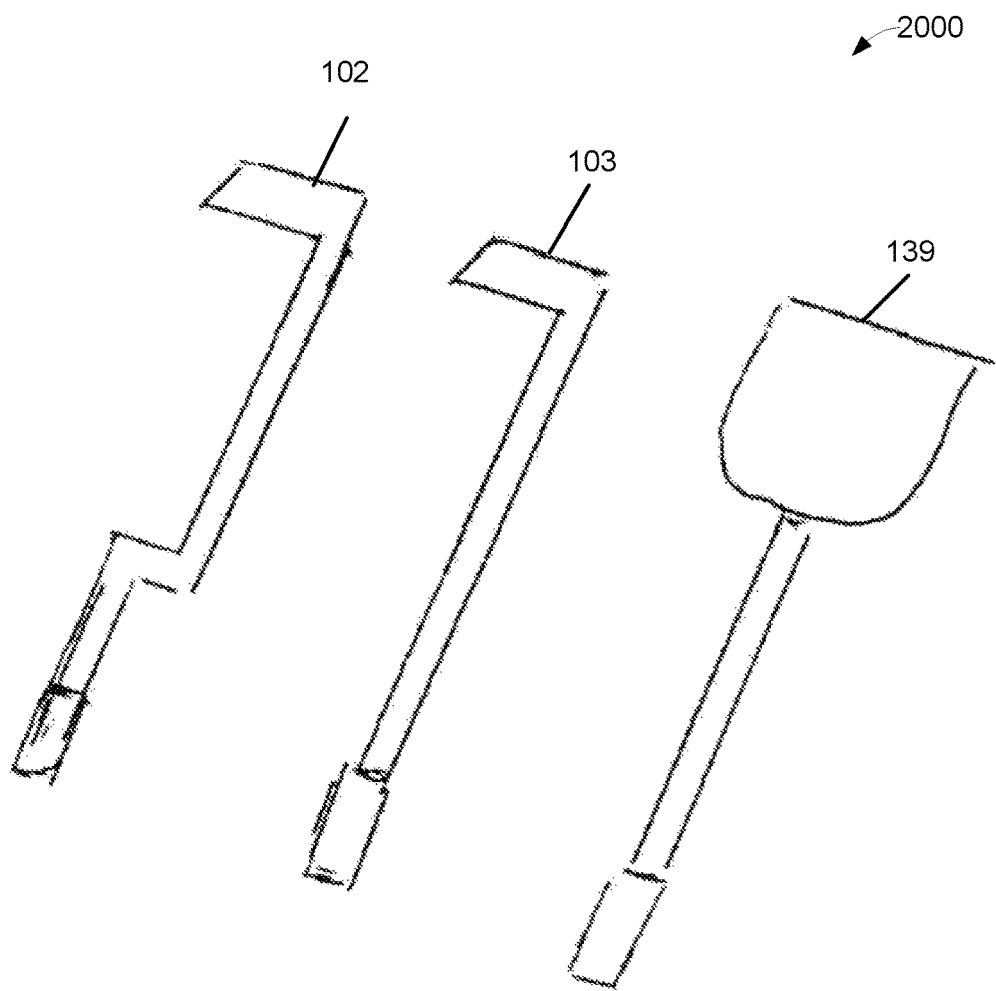
FIG. 20 illustrates, generally at 2000, view of one embodiment of the invention.
Figure 20:
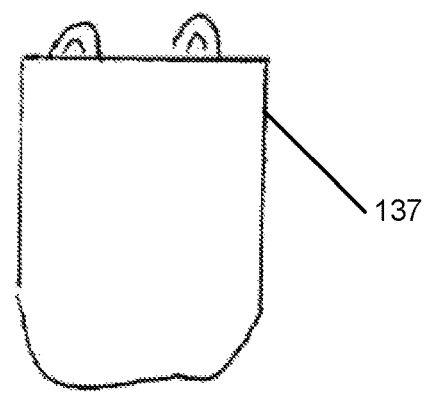

FIG. 20 illustrates, generally at 2000, view of one embodiment of the invention. At 102 is a first pasador (tool) for transferring charcoal from the main fire box through the opening onto the main grilling area, at 103 is a second tool (pasador) for transferring charcoal from the main fire box through the opening onto the main grilling area, at is a shovel fro use in cleaning the fire box of charcoal and/or ashes (ash shovel), and at 137 is a flat fan with two handles for fanning a charcoal fire.

Figure 21:
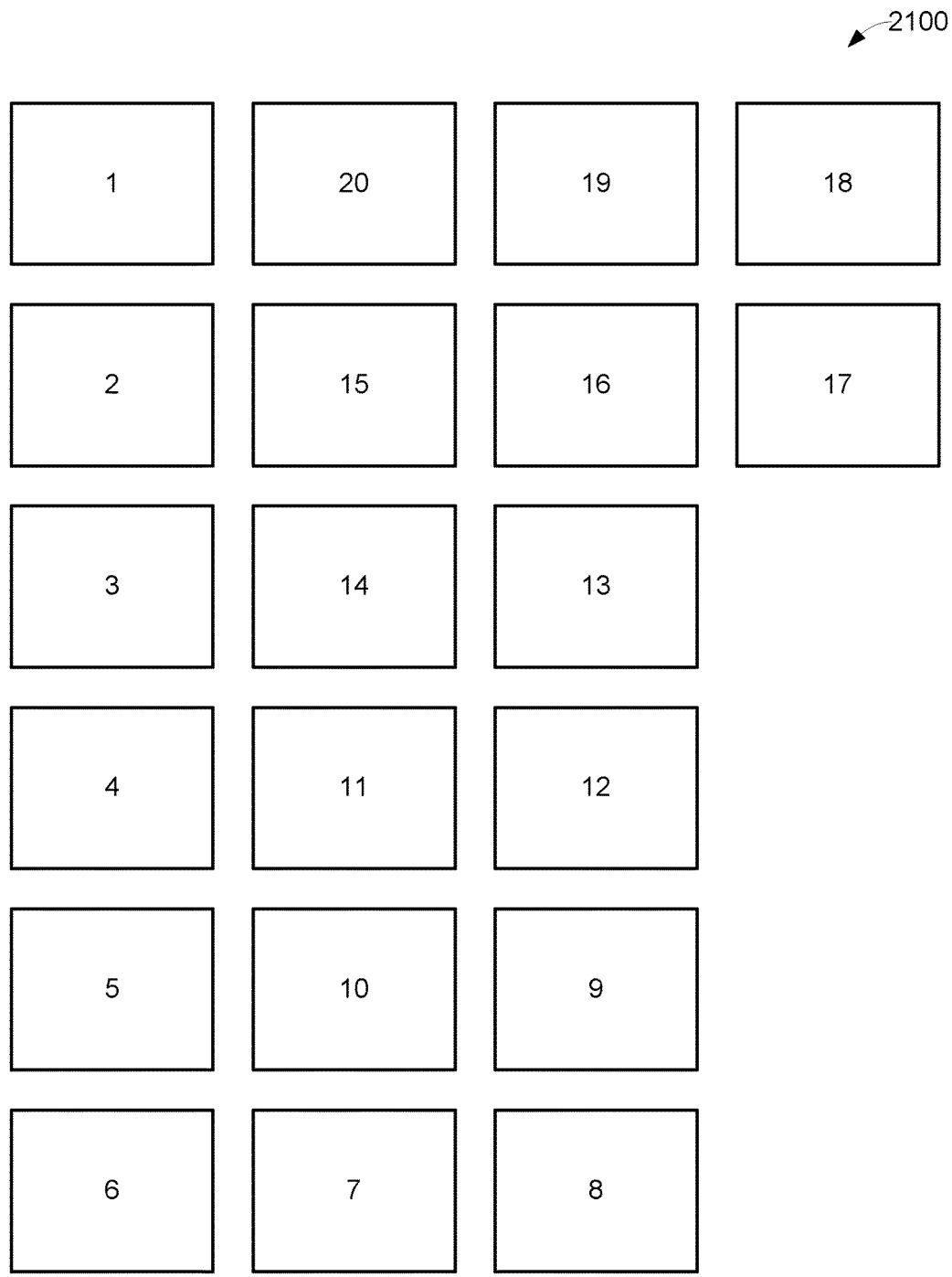
FIG. 21 illustrates, generally at 2100, various embodiments of the invention.

FIG. 21 illustrates, generally at 2100, various embodiments of the invention.

At item 1 a grill apparatus comprising: a fire box for holding charcoal, the fire box having a front side, a first side, a second side, a back side, a bottom, and a top; a transfer area fixedly attached to the fire box and located in proximity to the fire box first side and the fire box bottom; and the fire box having an opening in proximity to the fire box first side and the fire box bottom.

At item 2 the apparatus of item 1 wherein the fire box front side comprises a first door and a second door, the first door larger in size than the second door, and the first door located vertically above the second door.

At item 3 the apparatus of item 1 wherein the transfer area is in proximity to the second door.

At item 4 the apparatus of item 1 wherein the opening is of sufficient width and height to allow charcoal in the fire box to be transferred to the transfer area using a tool.

At item 5 the apparatus of item 4 wherein the tool comprises a handle at a first end and a hook at a distant end.

At item 6 the apparatus of item 1 further comprising a gas tank, a gas burner assembly, and a hose for connecting the gas tank to the gas burner assembly.

At item 7 the apparatus of item 6 wherein the gas burner assembly can be located proximate to the transfer area when gas is in use and located proximate to a metal base when charcoal is in use.

At item 8 the apparatus of item 6 wherein the gas burner assembly comprises a valve connect to the gas tank, an ignition, one or more burners, a metal box for the one or more burners, a tray holder for one or more long grill briquettes, and wherein the one or more long grill briquettes are rotatable.

At item 9 the apparatus of item 8 further comprising a brick lined surface in proximity to the transfer area.

At item 10 the apparatus of item 4 wherein the fire box bottom, first and second side, and back are brick lined.

At item 11 the apparatus of item 10 wherein the fire box top is open and in proximity to a roof having a chimney.

At item 12 a grilling apparatus comprising: a main grilling enclosure having a main grilling area, the main grilling area having a brick lined bottom; a main fire box enclosure having portions of the main fire box enclosure brick lined and wherein the main fire box enclosure and the main grilling enclosure are fixedly attached to each other; the main fire box enclosure having an openable door that opens frontward, the openable door being insulated, and an openable top; and the main grilling enclosure having an openable top.

At item 13 the grilling apparatus of item 12 further comprising a crank mechanism having a handle and ratchet with a releasable pawl.

At item 14 the grilling apparatus of item 13 wherein said crank mechanism can raise or lower a grilling surface with respect to a bed of charcoal being used to cook or a gas burner assembly being used to cook.

At item 15 the grilling apparatus of item 12 further comprising an opening between the main grilling enclosure and the main fire box, the opening of sufficient size to allow charcoal located in the main fire box to be moved into the main grilling area.

At item 16 the grilling apparatus of item 15 wherein the opening is located proximate to the bottom of the main grilling enclosure, and proximate to the bottom of the main fire box.

At item 17 the grilling apparatus of item 16 wherein a tool is used to move the charcoal located in the main fire box to the main grilling area.

At item 18 the grilling apparatus of item 13 further comprising a door that extends from below the brick lined bottom of the main grilling area to above a top of the brick lined bottom of the main grilling area.

At item 19 the grilling apparatus of item 18 wherein the door further is at least as wide as the brick lined bottom of the main grilling area.

At 20 a method comprising: sliding from a shelf of a multi fuel grill structure a gas burner assembly, the gas burner assembly comprising burners, control valves, and an ignition; and positioning the gas burner assembly in the multi fuel grill structure above the shelf.

Thus a Method and Apparatus for Multi-Fuel Grill have been described.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

As used in this description, "brick" or "brick lined" or similar phrases means a heat resistant material.

As used in this description, "ceramic grill briquette" or similar phrases means a briquette that is made of a material that does not burn at the temperatures encountered but rather acts as a heated radiating source of diffuse heat. For example, but not limited to, a ceramic grill briquette may be made of ceramic, may be made of lava rock, may be made of metal, or any combination thereof, etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a Method and Apparatus for Multi-Fuel Grill have been described.

What is claimed is:

1. A grill apparatus comprising:
   a fire box for holding charcoal, the fire box having a front side, a first side, a second side, a back side, a bottom, and a top;
   a transfer area fixedly attached to the fire box and located next to the fire box first side and the fire box bottom;

the fire box having an opening next to the fire box first side and the fire box bottom; and a gas burner assembly located next to the transfer area when gas is in use or located next to a metal base when charcoal is in use.

2. The apparatus of claim 1 wherein the fire box front side comprises a first door and a second door, the first door larger in size than the second door, and the first door located vertically above the second door.

3. The apparatus of claim 1 wherein the transfer area is next to the second door.

4. The apparatus of claim 1 wherein the opening is of sufficient width and height to allow charcoal in the fire box to be transferred to the transfer area using a tool.

5. The apparatus of claim 4 wherein the tool comprises a handle at a first end and a hook at a distant end.

6. The apparatus of claim 1 further comprising a gas tank, and a hose for connecting the gas tank to the gas burner assembly.

7. The apparatus of claim 6 wherein the gas burner assembly comprises a valve connect to the gas tank, an ignition, one or more burners, a metal box for the one or more burners, a tray holder for one or more long grill briquettes, and wherein the one or more long grill briquettes are rotatable.

8. The apparatus of claim 7 further comprising a brick lined surface next to the transfer area.

9. The apparatus of claim 4 wherein the fire box bottom, first and second side, and back are brick lined.

10. The apparatus of claim 9 wherein the fire box top is open and next to a roof having a chimney.

11. A grilling apparatus comprising:
a main grilling enclosure having a main grilling area, the main grilling area having a brick lined bottom;
a main fire box enclosure having portions of the main fire box enclosure brick lined and wherein the main fire box enclosure and the main grilling enclosure are fixedly attached to each other;
the main fire box enclosure having an openable door that opens frontward, the openable door being insulated, and an openable top;
the main grilling enclosure having an openable top; and
a crank mechanism raises or lowers a grilling surface with respect to a bed of charcoal being used to cook or a gas burner assembly being used to cook.

12. The grilling apparatus of claim 11 wherein the crank mechanism has a handle and ratchet with a releasable pawl.

13. The grilling apparatus of claim 11 further comprising an opening between the main grilling enclosure and the main fire box, the opening of sufficient size to allow charcoal located in the main fire box to be moved into the main grilling area.

14. The grilling apparatus of claim 13 wherein the opening is located proximate to the bottom of the main grilling enclosure, and next to the bottom of the main fire box.

15. The grilling apparatus of claim 14 wherein a tool is used to move the charcoal located in the main fire box to the main grilling area.

16. The grilling apparatus of claim 13 further comprising a door that extends from below the brick lined bottom of the main grilling area to above a top of the brick lined bottom of the main grilling area.

17. The grilling apparatus of claim 16 wherein the door further is at least as wide as the brick lined bottom of the main grilling area.

18. A grilling apparatus comprising:
a fire box, the fire box having a first side, a second side, a back side, a top, a bottom, and a front side;
the front side of the fire box having a hinged door that opens outward away from an interior of the fire box;
a main grilling area in the grilling apparatus, the grilling apparatus using a bed of charcoal, or gas, for cooking;
the main grilling area having a surface;
the fire box next to the main grilling area;
the fire box first side having an opening to the main grilling area, the opening next to the fire box bottom;
a shelf located below the main grilling area;
the shelf for storage of a moveable gas burner assembly, the moveable gas burner assembly comprising burners, control valves, and an ignition; and
the moveable gas burner assembly sized so that it is positioned on the main grilling area.

\* \* \* \* \*